US009183566B2

(12) United States Patent
Mhatre et al.

(10) Patent No.: US 9,183,566 B2
(45) Date of Patent: Nov. 10, 2015

(54) SYSTEMS AND METHODS FOR DISPLAYING ADVERTISEMENTS IN AN ADVERTISEMENT UNIT

(75) Inventors: Amit Mhatre, Mountain View, CA (US); Nathan Peter Lucash, San Francisco, CA (US)

(73) Assignee: Google Inc., Mountain View, CA (US)

( * ) Notice: Subject to any disclaimer, the term of this patent is extended or adjusted under 35 U.S.C. 154(b) by 17 days.

(21) Appl. No.: 13/274,221

(22) Filed: Oct. 14, 2011

(65) Prior Publication Data

US 2013/0097029 A1    Apr. 18, 2013

(51) Int. Cl.
| H04M 3/487 | (2006.01) |
| G06Q 30/00 | (2012.01) |
| G06Q 30/02 | (2012.01) |
| G06Q 50/10 | (2012.01) |

(52) U.S. Cl.
CPC ........ *G06Q 30/0241* (2013.01); *G06Q 30/0275* (2013.01); *G06Q 30/0276* (2013.01); *G06Q 50/10* (2013.01); *H04M 3/4878* (2013.01)

(58) Field of Classification Search
USPC ...................................................... 705/14.72
See application file for complete search history.

(56) References Cited

U.S. PATENT DOCUMENTS

| 5,712,995 | A * | 1/1998 | Cohn ............................. 715/792 |
| 5,937,392 | A * | 8/1999 | Alberts ....................... 705/14.52 |
| 6,339,438 | B1 * | 1/2002 | Bates et al. ................... 715/787 |
| 7,110,961 | B1 * | 9/2006 | Goino ......................... 705/14.14 |
| 7,315,983 | B2 | 1/2008 | Evans et al. |
| 7,697,791 | B1 * | 4/2010 | Chan et al. .................... 382/305 |
| 2002/0188635 | A1 * | 12/2002 | Larson .......................... 707/515 |
| 2007/0168859 | A1 | 7/2007 | Fortes |
| 2008/0103908 | A1 * | 5/2008 | Munk ............................. 705/14 |
| 2008/0109844 | A1 * | 5/2008 | Baldeschwieler et al. ...... 725/35 |
| 2008/0306999 | A1 | 12/2008 | Finger et al. |
| 2009/0240564 | A1 * | 9/2009 | Boerries et al. ................. 705/10 |
| 2010/0257054 | A1 * | 10/2010 | Martin et al. ............... 705/14.46 |

FOREIGN PATENT DOCUMENTS

| JP | 2009-171388 | 7/2009 |
| KR | 10-2006-0058008 | 5/2006 |
| KR | 10-2010-0021062 | 2/2010 |

OTHER PUBLICATIONS

Maurer-Stroh, "How to Resize a Picture Using Microsoft Paint", EMS Cross Stitch Board, Sep. 12, 2007, found on line at cross-stitch-board.com/forum.*
International Search Report & Written Opinion on PCT/US2012/059788, DTD Mar. 21, 2013, 13 pages.
International Preliminary Report on Patentability mailed on Apr. 24, 2014 in PCT Application No. PCT/US2012/059788, 7 pages.

* cited by examiner

*Primary Examiner* — John G Weiss
*Assistant Examiner* — Scott C Anderson
(74) *Attorney, Agent, or Firm* — Foley & Lardner LLP; John D. Lanza (57) ABSTRACT

A method for supporting multiple advertisement sizes in a single advertisement unit includes receiving a format preference for an advertisement unit and a selected advertisement and size for the selected advertisement. The method further includes applying editing properties to determine additional visual content for the selected advertisement. The additional visual content is determined based on the format preference of the advertisement unit and the size of the selected advertisement. The method further includes rendering the selected advertisement and the additional visual content in the advertisement unit based on the editing properties.

16 Claims, 8 Drawing Sheets

SYSTEMS AND METHODS FOR DISPLAYING ADVERTISEMENTS IN AN ADVERTISEMENT UNIT

BACKGROUND

The present disclosure relates generally to the display of advertisements in an advertisement unit for a website.

Advertisements displayed on a webpage on the Internet are displayed in advertisement units having predetermined dimensions (e.g., width, height). Often, advertisements are restricted such that only advertisements (e.g., image or Flash® animation advertisements) with dimensions that exactly fit the dimensions of the advertisement unit can be displayed in the advertisement unit.

If there is not a lot of inventory for a given advertisement unit (e.g., there are not many advertisements whose dimensions match the dimensions of the advertisement unit), there is a natural restriction on advertisements which can participate in an auction or selection for rendering in the advertisement unit. Further, in some instances, the dimensions of the advertisement unit may not match the dimensions of any available advertisements and text advertisements would have to be rendered in place of advertisements.

SUMMARY

One implementation relates to a method for supporting multiple advertisement sizes in a single advertisement unit. The method includes receiving a format preference for an advertisement unit. The method further includes receiving a selected advertisement and size for the selected advertisement. The method further includes applying editing properties to determine additional visual content for the selected advertisement. The additional visual content is determined based on the format preference of the advertisement unit and the size of the selected advertisement. The method further includes rendering the selected advertisement and the additional visual content in the advertisement unit based on the editing properties.

Another implementation relates to a system for supporting multiple advertisement sizes in a single advertisement unit. The system includes an advertisement management system configured to select an advertisement. The system further includes an advertisement display system. The advertisement display system includes a processing circuit, wherein the processing circuit receives the selected advertisement from the advertisement management system. The processing circuit is configured to receive a format preference for an advertisement unit of a website, receive the size for the selected advertisement, apply editing properties to determine additional visual content for the selected advertisement, and render the selected advertisement and the additional visual content in the advertisement unit by applying the editing properties. The additional visual content is determined based on the format preference of the advertisement unit and the size of the selected advertisement.

Yet another implementation relates to one or more computer-readable media having instructions stored therein, the instructions being executable by one or more processors to cause the one or more processors to perform operations. The instructions include receiving a format preference for an advertisement unit, receiving a selected advertisement and size for the selected advertisement, applying editing properties to determine additional visual content for the selected advertisement, and rendering the selected advertisement and the additional visual content in the advertisement unit by applying the editing properties. The additional visual content is determined based on the format preference of the advertisement unit and the size of the selected advertisement.

These implementations are mentioned not to limit or define the scope of the disclosure, but to provide an example of an implementation of the disclosure to aid in understanding thereof. Particular implementations may be developed to realize one or more of the following advantages.

The details of one or more implementations of the disclosure are set forth in the accompanying drawings and the description below. Other features, aspects, and advantages of the disclosure will become apparent from the description, the drawings, and the claims.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Referring generally to the figures, systems and methods for advertisement display in an advertisement unit are disclosed. Advertisements may be rendered in the advertisement unit such that the dimensions of the advertisements are different than the dimensions of the advertisement unit. In an implementation of the present disclosure, the dimensions of the advertisements are smaller than the dimensions of the advertisement unit. Various editing properties may be applied to determine additional visual content to display with the advertisement upon rendering of the advertisement in the advertisement unit. Such visual content may be used to allow advertisements whose dimensions do not match the dimensions of the advertisement unit to be displayed in a more aesthetically pleasing format. This increases the number of potential advertisements that may be displayed in a given advertisement unit.

Figure 1:
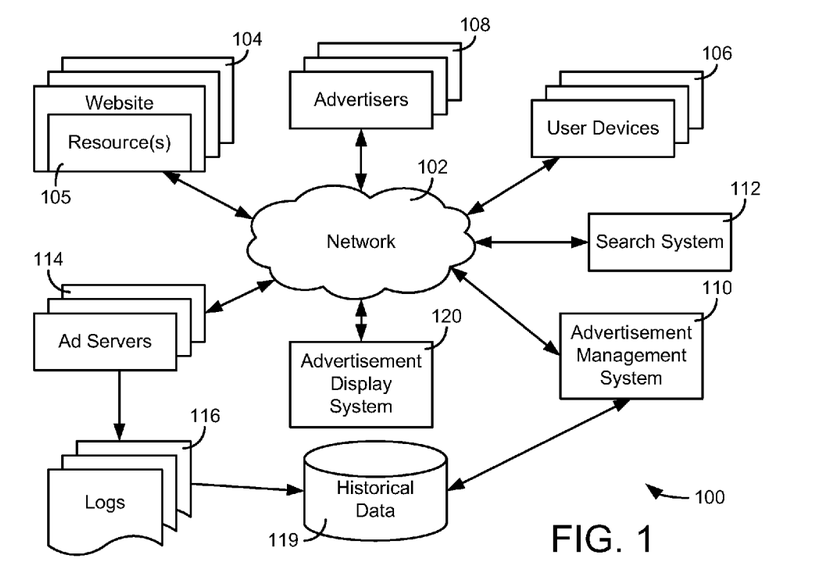
FIG. 1 is a block diagram of an example environment in which an advertisement management system manages advertising services in accordance with a described implementation.

Referring to FIG. 1, a block diagram of an example environment 100 in which an advertisement management system manages advertising services is shown in accordance with a described implementation. The example environment 100 and the advertisement management system as shown and described in FIG. 1 is used to execute the systems and methods described in the present disclosure (e.g., to select advertisements to be displayed in an advertisement unit and to display the additional visual content).

Environment 100 includes a network 102, such as a local area network (LAN), a wide area network (WAN), the Internet, or a combination thereof. Network 102 connects websites 104, user devices 106, advertisers 108, and an advertisement management system 110. Environment 100 may include many thousands of websites 104, user devices 106, and advertisers 108.

A website 104 includes one or more resources 105 associated with a domain name and hosted by one or more servers. An example website is a collection of web pages formatted in hypertext markup language (HTML) that may contain text, images, multimedia content, and programming elements, such as scripts.

A resource 105 is any data that may be provided over network 102. A resource 105 is identified by a resource address that is associated with the resource 105, such as a uniform resource locator (URL). Resources 105 may include web pages, word processing documents, portable document format (PDF) documents, images, video, programming elements, interactive content, and feed sources, to name only a few. Resources 105 may include content, such as words, phrases, images and sounds, that may include embedded information (such as meta-information in hyperlinks) and/or embedded instructions. Embedded instructions may include code that is executed at a user's device, such as in a web browser. Code may be written in languages, such as, JavaScript® or ECMAScript®.

A user device 106 is an electronic device that is under control of a user and is capable of requesting and receiving resources 105 over network 102. Example user devices 106 include personal computers, mobile communication devices, and other devices that may send and receive data over network 102. User device 106 typically includes a user application, such as a web browser, to facilitate the sending and receiving of data over network 102.

A user device 106 may request resources 105 from website 104. In turn, data representing a resource 105 may be provided to user device 106 for presentation by user device 106. The data representing the resource 105 may include data specifying a portion of the resource or a portion of a user display (e.g., a presentation location of a pop-up window or in a slot of a web page) in which advertisements may be presented. These specified portions of the resource 105 or user display are referred to as advertisement slots or advertisement units.

To facilitate searching of the vast number of resources 105 accessible over network 102, environment 100 may include a search system 112 that identifies resources 105 by crawling and indexing resources 105 provided on websites 104. Data about resources 105 may be indexed based on the resource 105 with which the data is associated. The indexed and, optionally, cached copies of resources 105 are stored in a search index (not shown).

User devices 106 may submit search queries to search system 112 over network 102. In response, search system 112 accesses the search index to identify resources 105 that are relevant to the search query. In one implementation, a search query includes one or more keywords. Search system 112 identifies the resources 105 that are responsive to the query, provides information about the resources 105 in the form of search results and returns the search results to user devices 106 in search results pages. A search result may include data generated by search system 112 that identifies a resource 105 that is responsive to a particular search query, and may include a link to the resource 105. An example search result may include a web page title, a snippet of text or a portion of an image extracted from website 104, a rendering of the resource 105, and the URL of website 104. Search results pages may also include one or more advertisement units in which advertisements may be presented.

Search results pages are described as one example of a webpage for which advertisement units may be presented for; it should be understood that the type of webpage the advertisement units are presented are varied. In other implementations, any webpage may be used in environment 100. For example, a webpage including a news article may be the webpage and resources may be determined and advertisement units may be presented on the webpage. The description of search results pages are presented as an example for which the systems and methods of the present disclosure may be used for.

A search result page may be sent with a request from search system 112 for the web browser of user device 106 to set an HTTP (HyperText Transfer Protocol) cookie. A cookie may represent, for example, a particular user device 106 and a particular web browser. For example, search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie may store a variety of data, including a unique or semi-unique identifier. The unique or semi-unique identifier may be anonymized and is not connected with user names. Because HTTP is a stateless protocol, the use of cookies allows an external service, such as search system 112 or another system, to track particular actions and status of a user over multiple sessions. A user may opt out of tracking user actions, for example, by disabling cookies in the browser's settings.

When a resource 105 or search results are requested by user device 106 or provided to user device 106, the advertisement management system 110 receives a request for advertisements to be provided with the resource 105 or search results. The request for advertisements may include characteristics of the advertisement units that are defined for the requested resource 105 or search results page, and may be provided to advertisement management system 110. For example, a reference (e.g., URL) to the resource 105 for which the advertisement unit is defined, a size of the advertisement unit (e.g., the dimensions of the advertisement unit), and/or media types that are available for presentation in the advertisement unit may be provided to advertisement management system 110. Similarly, keywords (i.e., one or more words that are associated with content) associated with a requested resource 105 ("resource keywords") or a search query for which search results are requested may also be provided to advertisement management system 110 to facilitate identification of advertisements that are relevant to the resource 105 or search query.

The request for advertisement(s) may include an identification of user data from a user of the website, which may be provided to advertisement management system 110. Advertisement management system 110 may assign interest data to the user based on the identification of user data and associate the interest data with advertisements provided by an advertiser. Advertisement management system 110 may associate content (e.g., keywords, pictures, videos, etc.) with the interest data to provide advertisements that are relevant to the second user.

Based on data included in the request for advertisements, advertisement management system 110 may provide advertisements that are eligible to be provided in response to the request ("eligible advertisements"). Eligible advertisements may include advertisements that can fit into the advertisement unit (e.g., advertisements whose dimensions fit within the dimensions of the advertisement unit). Eligible advertisements may further include advertisements having characteristics matching the user data identified by the user.

Advertisement management system 110 selects one or more eligible advertisements for each advertisement slot of a resource 105 (e.g., profile of a user on a website) or of a webpage. Advertisement management system 110 may select the eligible advertisements from an advertisement database. The advertisement database may be a cloud database in communication with advertisement management system 110. The resource 105 or webpage is received by user device 106 for presentation by user device 106. User interaction data representing user interactions with presented advertisements may be stored in a historical data store 119. For example, when an advertisement is presented to the user via an ad server 114, data may be stored in a log file 116. This log file 116 may be aggregated with other data in historical data store 119. Accordingly, historical data store 119 contains data representing the advertisement impression. For example, the presentation of an advertisement is stored in response to a request for the advertisement that is presented. For example, the ad request may include data identifying a particular cookie, such that data identifying the cookie may be stored in association with data that identifies the advertisement(s) that were presented in response to the request. In some implementations, the data may be stored directly to historical data store 119.

Similarly, when a user selects (e.g., clicks, touches, signals, etc.) a presented advertisement, data representing the selection of the advertisement may be stored in log file 116, a cookie, or historical data store 119. In some implementations, the data is stored in response to a request for a web page that is linked to by the advertisement. For example, the user selection of the advertisement may initiate a request for presentation of a web page that is provided by (or for) the advertiser. The request may include data identifying the particular cookie for the user device, and this data may be stored in historical data store 119.

User interaction data may be associated with unique identifiers that represent a corresponding user device with which the user interactions were performed. For example, in some implementations, user interaction data may be associated with one or more cookies. Each cookie may include content which specifies an initialization time that indicates a time at which the cookie was initially set on the particular user device 106.

Log files 116, or historical data store 119, also store references to advertisements and data representing conditions under which each advertisement was selected for presentation to a user. For example, historical data store 119 may store targeting keywords, bids, and other criteria with which eligible advertisements are selected for presentation. Additionally, historical data store 119 may include data that specifies a number of impressions for each advertisement and the number of impressions for each advertisement may be tracked, for example, using the keywords that caused the advertisement impressions and/or the cookies that are associated with the impressions. Data for each impression may also be stored so that each impression and user selection may be associated with (i.e., stored with references to and/or indexed according to) the advertisement that was selected and/or the targeting keyword that caused the advertisement to be selected for presentation.

Environment 100 further includes an advertisement display system 120. Advertisement display system 120 is configured to apply image editing to the advertisements for display on webpages 104. The function of advertisement display system 120 is shown in greater detail in FIGS. 2-9. While advertisement display system 120 is shown as a separate system in FIG. 1, advertisement display system 120 may be a part of advertisement management system 11, directly connected to websites 104, or may be a part of any other system or module within environment 100.

Environment 100 is illustrated as an example environment for use with the systems and methods of the present disclosure; in various implementations, environment 100 may include more or less systems and modules for use with the systems and methods of the present disclosure. For example, search system 112 may be excluded from environment 100 and the advertisements may be provided by advertisement management system 110 for webpages other than search result pages. As another example, environment 100 may exclude historical data store 119 and log files 116 but is still able to render advertisements in an advertisement unit for user devices 106.

Figure 2:
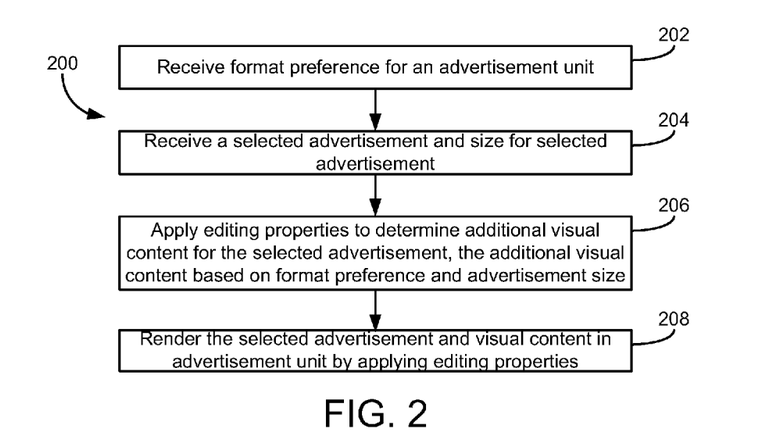
FIG. 2 is a flow diagram of a method of applying editing properties to determine visual content to an advertisement for display in an advertisement unit.

Referring to FIG. 2, a flow diagram of a method 200 for applying editing properties to determine visual content for the advertisement for display in an advertisement unit is shown in accordance with a described implementation. Method 200 is provided by way of example, as there are a number of ways to carry out the methods according to the present disclosure. Method 200 may be executed or otherwise performance by one of a combination of various systems. Method 200 may be implemented by a computer, a computer program product, a computer program, a client, a server, a client-server relationship, etc. Method 200 is described herein as carried out by advertisement display system 120 shown in environment 100 of FIG. 1, by way of example.

Method 200 includes receiving an format preference for an advertisement unit (step 202). The advertisement unit may be for display on a website such as websites 104 described in FIG. 1. The format preference for the advertisement unit may include the dimensions of the advertisement unit (e.g., the height and width of the advertisement unit). Other format preferences may include a background of the advertisement unit and other configuration information of the advertisement unit in relation to the other content displayed on the webpage.

Method 200 further includes receiving a selected advertisement and size for the selected advertisement (step 204). The selected advertisement may be determined by, for example, advertisement management system 110 of FIG. 1. The size of the selected advertisement may include the dimensions of the advertisement (e.g., height and width). Further, additional advertisement information may be received at step 204 (e.g., attribution information, display preferences, etc.). It should be understood that the selected advertisement as described in the present disclosure may be any type of advertisement (e.g., an image advertisement, a Flash® animation advertisement, composite HTML advertisement, video advertisements, any combination of types of advertisements, etc.) in accordance with one implementation. According to other implementations, other types of advertisements may be used with the systems and methods described herein.

Method 200 further includes applying editing properties to determine additional visual content for the selected advertisement (step 206). The additional visual content is determined using the format preference of the advertisement unit and the size of the selected advertisement. Additional visual content may include, for example, blank space such that inserting the blank space in the advertisement unit allows the advertisement to appear centered in the advertisement unit. If the dimensions of the advertisement are smaller than the dimensions of the advertisement unit, the blank space is used to give the appearance of a centered advertisement. The blank space may also be used to justify the advertisement in other locations (e.g., upper, lower, left, right) of the advertisement unit.

As another example of visual content, the background of the advertisement unit may be made transparent. Making the background transparent allows the background of the rest of the webpage to show through a portion or all of the space of the advertisement unit. As yet another example, the visual content may include a border shown to surround the advertisement or advertisement unit. The border may be, for example, a shadow applied to the border of the advertisement or advertisement unit. FIGS. 5-9, discussed in greater detail below, show examples of visual content.

The editing may further include rendering the advertisement in its own frame. By rendering the advertisement in its own frame, if a portion of the advertisement was meant to be hidden from view of a user of the website, the portion may remain hidden when the advertisement is displayed with the additional visual content in the advertisement unit.

The visual content may further include widgets or attributions and the editing properties may include adjusting the location of the widgets and attributions in the advertisement unit. As one example, the widgets and attributions may be configured to be displayed within the advertisement unit. Editing properties may be used to display the widgets and attributions within the advertisement unit such that the widgets and attributions do not obscure the view of the advertisement. Such a configuration is shown in greater detail in FIGS. 5-9.

Method 200 further includes rendering the selected advertisement and visual content in the advertisement unit by applying the editing properties (step 208).

Figure 3:
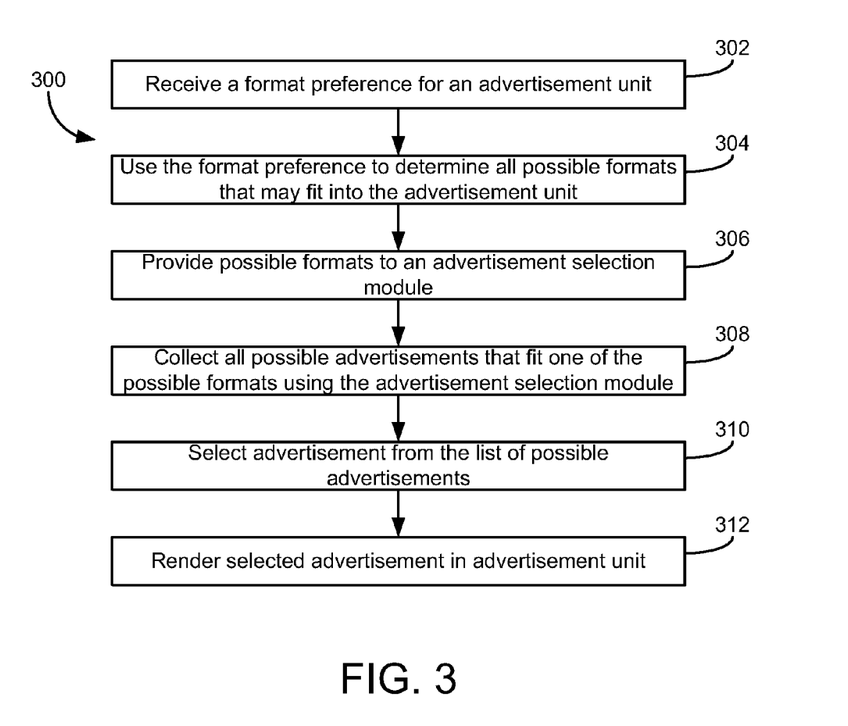
FIG. 3 is a flow diagram of a method for rendering an advertisement in an advertisement unit.

Referring to FIG. 3, a flow diagram of a method 300 for rendering an advertisement in an advertisement unit is shown in accordance with a described implementation. Method 300 is provided by way of example, as there are a number of ways to carry out the methods according to the present disclosure. Method 300 may be executed or otherwise performance by one of a combination of various systems. Method 300 may be implemented by a computer, a computer program product, a computer program, a client, a server, a client-server relationship, etc. Method 300 is described herein as carried out by the advertisement display system 120 shown in environment 100 of FIG. 1, by way of example.

Method 300 includes receiving an format preference for an advertisement unit (step 302). Method 300 further includes using the format preference to determine all possible formats that may fit into the advertisement unit (step 304). For example, if the format preference for the advertisement unit includes specifying a size in pixels such as 336×280, in step 304 all possible formats that may fit into the 336×280 size may be determined (e.g., 336×280, 300×250, 250×250, 200×200, etc.).

All possible formats are provided to an advertisement selection module (step 306) along with other information as described in environment 100 of FIG. 1. The possible formats may be used as a filter by the advertisement selection module (e.g., advertisement management system 110 of FIG. 1) such that only advertisements that fit the advertisement unit are selected.

The advertisement selection module may collect all possible advertisements that fit one of the possible formats (step 308) and selects an advertisement from the list of possible advertisements (step 310). The selection may be made via a lottery or auction, may be random, or may be selected by any other method. The selected advertisement is then rendered in the advertisement unit (step 312) as generally described in FIG. 2.

Figure 4:
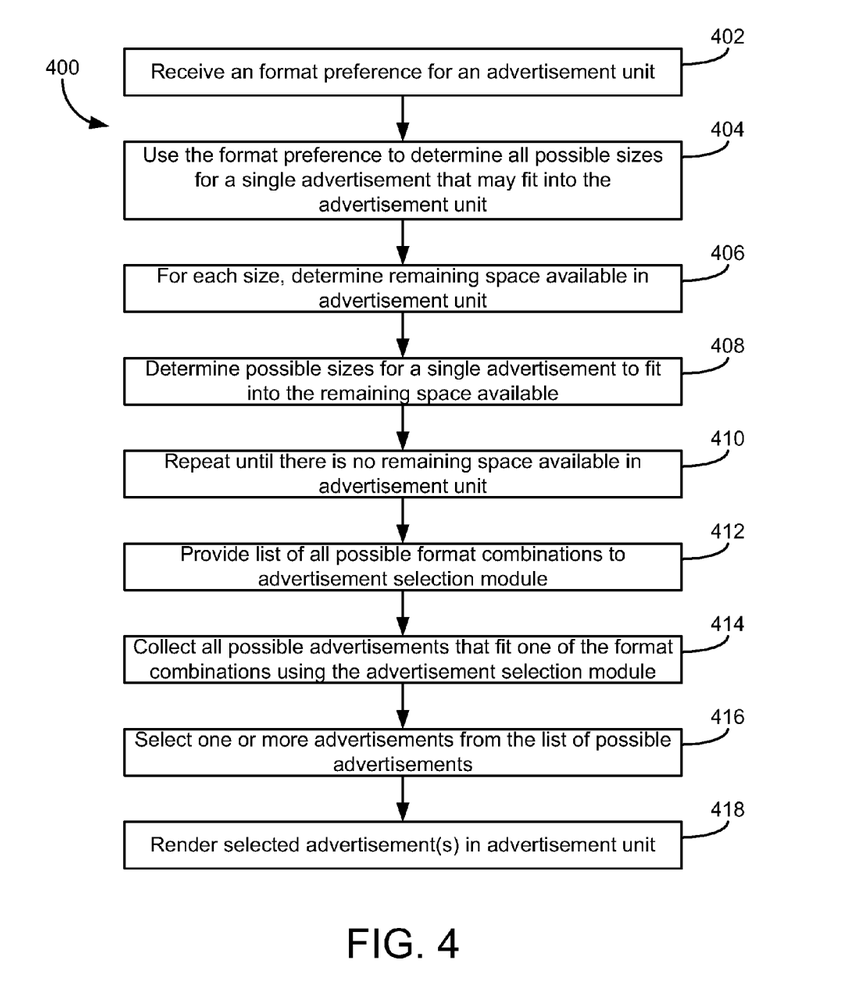
FIG. 4 is a flow diagram of a method for rendering multiple advertisements in an advertisement unit.

Referring to FIG. 4, a flow diagram of a method 400 for rendering multiple advertisements in an advertisement unit is shown in accordance with a described implementation. Method 400 is provided by way of example, as there are a number of ways to carry out the methods according to the present disclosure. Method 400 may be executed or otherwise performance by one of a combination of various systems. Method 400 may be implemented by a computer, a computer program product, a computer program, a client, a server, a client-server relationship, etc. Method 400 is described herein as carried out by the advertisement display system 120 shown in environment 100 of FIG. 1, by way of example.

Compared to method 300 of FIG. 3, method 400 describes an implementation where multiple advertisements are displayed in a single advertisement unit. If a first advertisement is selected for display in the advertisement unit and there is enough empty space in the advertisement unit to display a second advertisement (or more), method 400 is used to select the second advertisement.

Method 400 includes receiving an format preference for an advertisement unit (step 402). Method 400 further includes using the format preference to determine all possible sizes for a single advertisement that may fit into the advertisement unit (step 404). For each possible size, there may be remaining unused space in the advertisement unit. Method 400 includes determining the remaining space available in the advertisement unit for each possible size (step 406).

For the remaining space available, possible sizes that fit into the remaining space may be determined (step 408). Steps 406 and 408 may then be repeated until there is no remaining space available in the advertisement unit (step 410). The result of steps 406-410 may be a list of possible combinations of sizes for advertisements for the advertisement module. As one example, if an advertisement unit has dimensions of 600×400, step 404 includes determining that both 400×400 and 600×400 sized advertisements fit into the advertisement unit, step 406 includes determining that for the 400×400 size, there remains 200×400 pixels of unused space in the advertisement unit, and step 408 includes determining that a 200×400 sized advertisement can fit into the advertisement unit in addition to a 400×400 sized advertisement. The combination of 400×400 and 200×400 may then be provided such that one advertisement that fits the 400×400 size and one advertisement that fits the 200×400 size may be chosen for display in the advertisement unit.

Method 400 further includes providing the list of all possible format combinations to the advertisement selection module (step 412). All possible advertisements that fit one of the format combinations are collected using the advertisement selection module (step 414) and one or more advertisements are selected (step 416). The selection may be made via a lottery or auction, may be random, or may be selected by any other method. The one or more selected advertisements are then rendered in the advertisement unit (step 418).

Referring generally to FIGS. 5-9, various websites with advertisement units are shown which illustrate the various editing properties and visual content described in the present disclosure. While the websites illustrated in FIGS. 5-9 illustrate a news story and a single advertisement unit, it should be understood that the systems and methods of the present disclosure may be used for any number of advertising units in a webpage and for any type of webpage that includes an advertisement unit. The advertisement unit shown in FIGS. 5-9 is shown with a border; it should be understood that the border is shown for illustrative purposes only and that the display of a border of the advertisement unit is not required for the systems and methods of the present disclosure.

Figure 5:
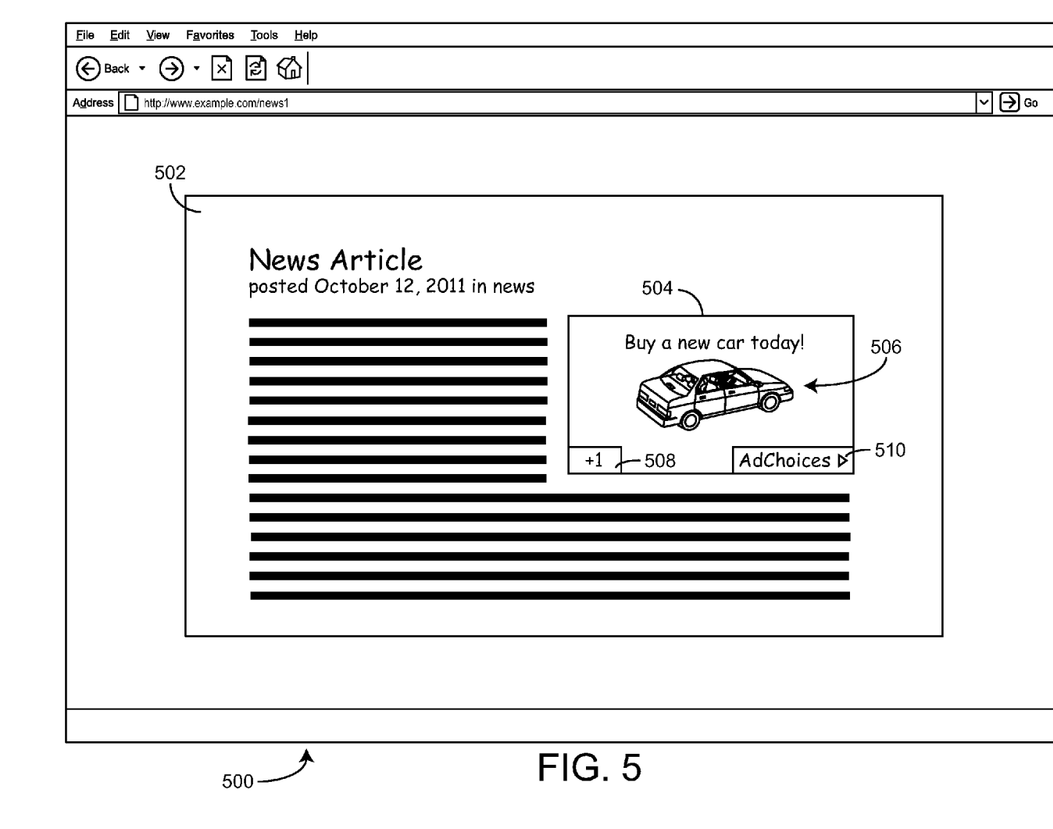
FIG. 5 is an illustration of an example of rendering an advertisement in an advertisement unit.

Referring to FIG. 5, website 500 includes a news article 502 with an advertisement unit 504. An advertisement 506 is shown centered within advertisement unit 504, leaving unused space above, below, to the left of, and to the right of the content of the advertisement (a picture of a car and the message "Buy a new car today!"). Advertisement 506 is shown centered instead of being displayed in the upper left corner or in another location. The image editing properties as described in FIG. 2 may be used to generate visual content in the form of blank space. The blank space is inserted into advertisement unit 504 such that when advertisement 506 is placed below (or next to) the blank space, advertisement 506 appears centered.

Advertisement unit 504 further shows additional visual content in the form of a widget 508 and attribute 510. Widget 508 and attribute 510 are shown displayed directly below advertisement 506 within advertisement unit 504. Widget 508 and attribute 510 may be configured to be displayed within advertisement unit 504 without obscuring advertisement 506. The editing properties as described in FIG. 2 may be used to change the location of widget 508 and attribute 510 such that widget 508 and attribute 510 are not displayed within the dimensions of advertisement 506. The advertisement display system may be configured to determine the dimensions of advertisement 506 and to change the location of widget 508 and attribute 510 with respect to advertisement 506 such that the widget 508 and attribute 510 appear directly below advertisement 506 as shown.

Figure 6:
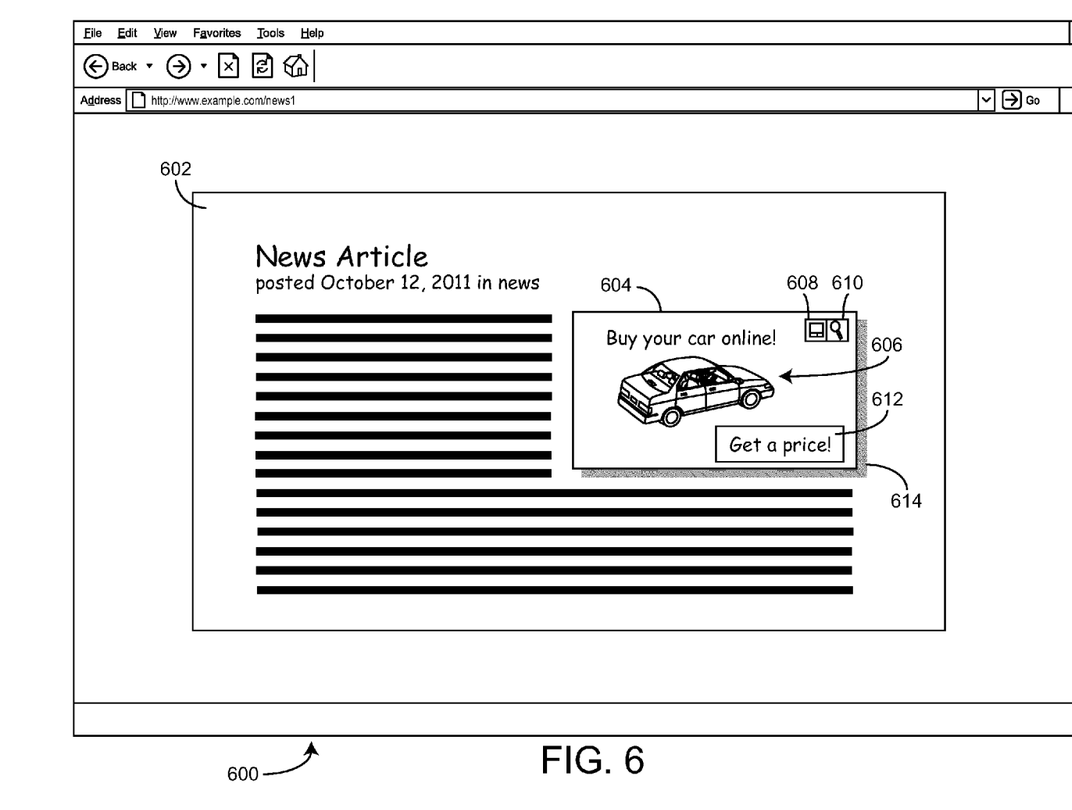
FIG. 6 is an illustration of another example of rendering an advertisement in an advertisement unit.

Referring to FIG. 6, website 600 includes news article 602 and advertisement unit 604. Advertisement unit 604 includes a displayed advertisement 606 centered and a clickable icon 612. Clickable icon 612 may be configured to be displayed inside advertisement unit 604 (such as widget 508 and attribute 510), in a corner of advertisement unit 604, or in any other location.

Advertisement 606 in advertisement unit 604 includes additional visual content in the form of utility buttons 608, 610. Utility buttons 608, 610 may be configured to be displayed in a corner of advertisement unit 604 or in any other location. Utility buttons 608, 610 may be rendered by the advertisement display system in order to fill unused space in advertisement unit 604. Utility buttons 608, 610 may provide various controls. For example, utility button 608 may allow the user to save the advertisement or advertisement information, utility button 610 may allow the user to zoom the advertisement in or out, and other utility buttons may be provided to rotate or pan across the contents of the advertisements.

Advertisement unit 604 includes additional visual content in the form of a shadow 614. The advertisement display system may be configured to add a border (e.g., a shadow) to advertisement unit 604 to help fill in unused space in advertisement unit 604. The border may be of any pattern, color, or design.

Figure 7:
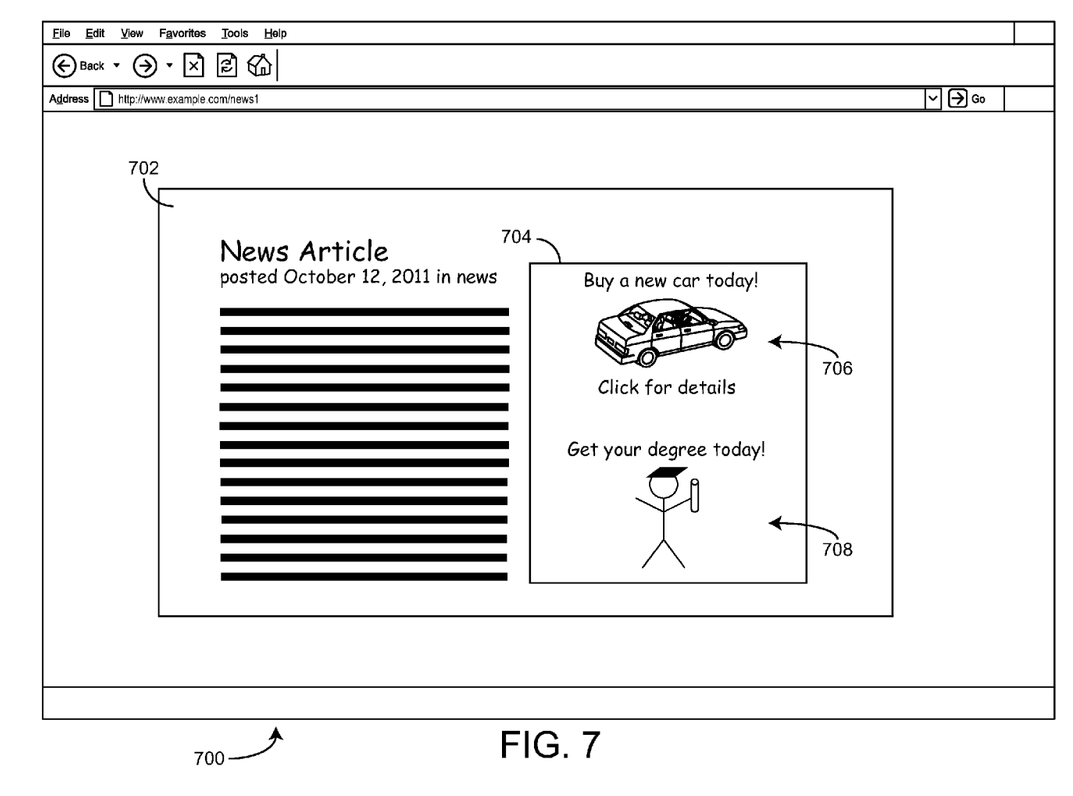
FIG. 7 is an illustration of an example of rendering multiple advertisements in an advertisement unit.
Figure 8:
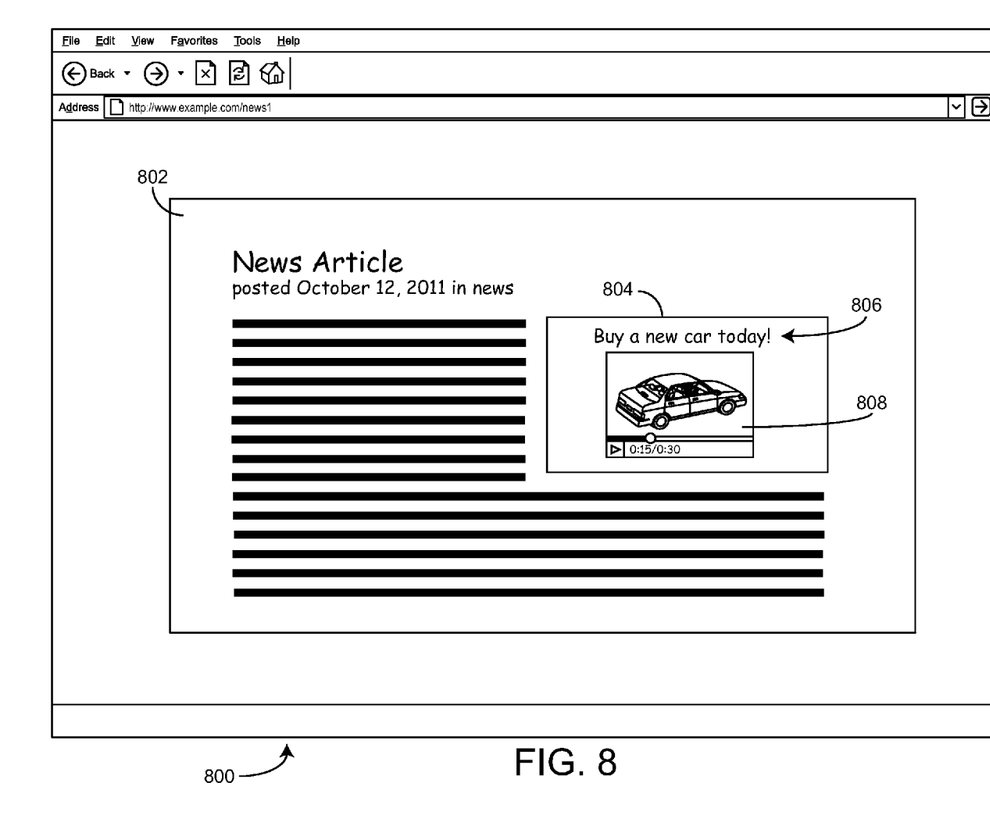
FIG. 8 is an illustration of yet another example of rendering an advertisement in an advertisement unit.

Referring to FIG. 7, website 700 includes news article 702 and advertisement unit 704. As described with reference to FIG. 4, advertisement unit 704 is configured to display multiple advertisements if multiple advertisements can fit into the unit. Two advertisements 706, 708 are shown rendered in advertisement unit 704. Advertisements 706, 708 may be centered in their given space for display in advertisement unit 704 and the editing properties as described in FIG. 2 may be generally applied to both advertisements 706, 708. For example, advertisement 706 may be "assigned" the top half of advertisement unit 704 and may be edited for display within just the top half of the unit, while advertisement 708 may be "assigned" the bottom half Referring to FIG. 8, website 800 includes news article 802 and advertisement unit 804. Advertisement 806 is displayed within advertisement unit 804 and includes a video component 808. For advertisements with a video component, the video component may be rendered within advertisement unit 804 and then the advertisement display system may be configured to apply editing properties to the other portions of advertisement 806.

Figure 9:
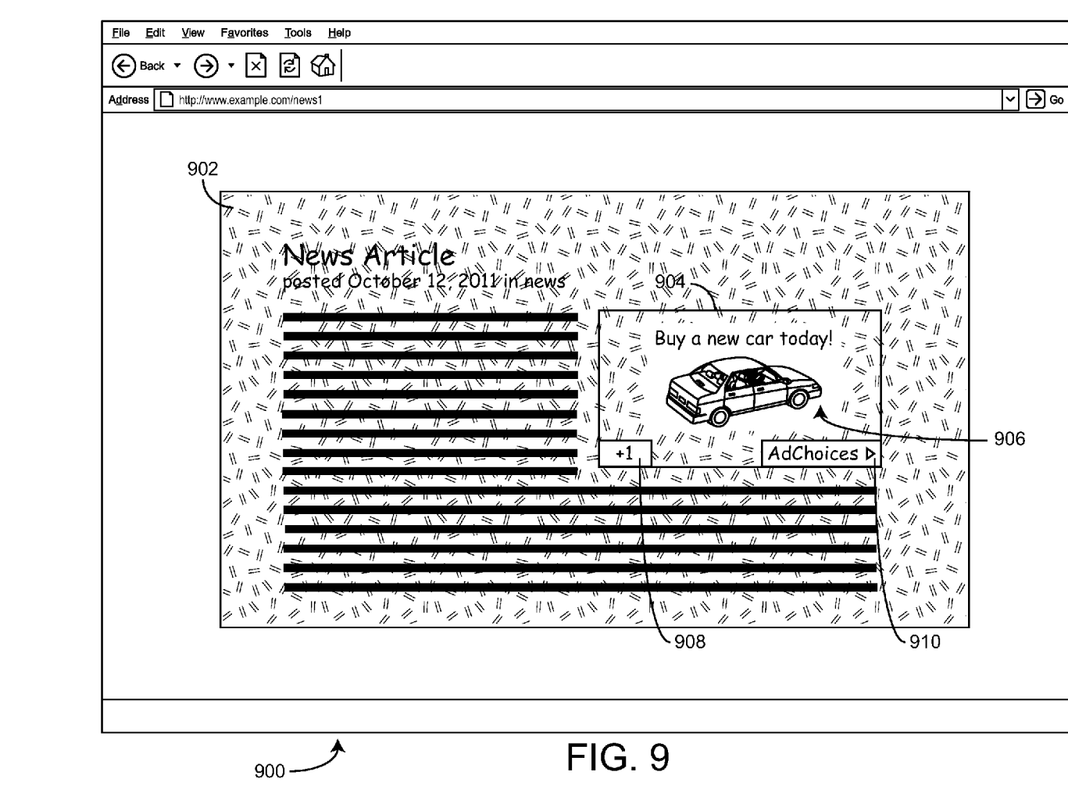
FIG. 9 is an illustration of yet another example of rendering an advertisement in an advertisement unit.

Referring to FIG. 9, website 900 includes news article 902 and advertisement unit 904. Advertisement 906 is displayed within advertisement unit 904. Website 900 includes a background including a pattern. The advertisement display system may be configured to make the background of advertisement unit 904 transparent such that the background pattern is visible within advertisement unit 904 (e.g., by adding visual content to advertisement unit 904 that allows the background to become transparent). The transparency allows the unused space within advertisement unit 904 to be filled in with the pattern. Advertisement 906 is shown as not transparent, e.g., the pattern is not visible within the space of advertisement 906. In another implementation, the advertisement display system may be configured to make advertisement 906 transparent as well.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a Web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An automated computer-implemented method for supporting multiple advertisement sizes in a single advertisement unit, comprising:
   receiving, via a computer system, a format preference for an advertisement unit of a website separate from content of the website, the format preference specifying an advertisement unit dimensional height and an advertisement unit dimensional width of the advertisement unit;
   determining, by the computer system, a set of advertisement formats based on the specified advertisement unit dimensional height and the specified advertisement unit dimensional width of the format preference of the advertisement unit, each of the determined advertisement formats having a format dimensional height equal to or less than the specified advertisement unit dimensional height and a format dimensional width equal to or less than the specified advertisement unit dimensional width;
   filtering, by the computer system, a set of advertisements based on the determined set of advertisement formats;
   selecting, by the computer system, an advertisement from the filtered set of advertisements based on an auction;
   determining additional visual content to display with the selected advertisement within the advertisement unit of the website and separate from the content of the website, the determined additional visual content based on a dimensional height and a dimensional width of the selected advertisement and the specified advertisement unit dimensional height and the specified advertisement unit dimensional width, the additional visual content displayed in space present in the advertisement unit and not filled by the selected advertisement;
   applying editing properties to the determined additional visual content to be displayed with the selected advertisement and separate from the selected advertisement in the advertisement unit; and
   serving, by the computer system, the selected advertisement and the additional visual content to be displayed at the same time in the advertisement unit, the display of the selected advertisement and the additional visual content based on the applied editing properties.

2. The method of claim 1, wherein the determined additional visual content comprises blank space, wherein applying editing properties comprises generating blank space to surround the selected advertisement when the advertisement is centered in the advertisement unit.

3. The method of claim 1, wherein the selected advertisement includes a video portion and the additional visual content is rendered around the video portion of the selected advertisement.

4. The method of claim 1, wherein the additional visual content comprises one or more user clickable icons.

5. The method of claim 1, wherein the additional visual content comprises one or more attributions of the selected advertisement.

6. The method of claim 1, wherein the additional visual content comprises a border to the selected advertisement.

7. The method of claim 1, wherein the additional visual content comprises one or more advertisement display adjustment controls.

8. The method of claim 1, wherein the format preference specifying the advertisement unit dimensional height and advertisement unit dimensional width of the advertisement unit and the format dimensional height and format dimensional width display size of the selected advertisement is measured in pixels.

9. The method of claim 1 wherein determining the set of advertisement formats further comprises:
   determining a dimensional size of remaining space in the advertisement unit for each advertisement format of the determined set of advertisement formats; and
   determining a second set of advertisement formats based on the determined dimensional size of remaining space, each of the determined advertisement formats of the second set of advertisement formats having a format dimensional height and a format dimensional width equal to or less than the determined dimensional size of remaining space.

10. The method of claim 9 further comprising:
   providing a set of format combinations to an advertisement selection module based on the determined set of advertisement formats based on the specified advertisement unit dimensional height and the specified advertisement unit dimensional width of the format preference of the advertisement unit and the determined second set of advertisement formats based on the determined dimensional size of remaining space;
   wherein each format combination of the set of format combinations comprises a first advertisement format from the determined set of advertisement formats and a second advertisement format from the determined second set of advertisement formats based on the determined dimensional size of remaining space for the first advertisement format; and
   wherein the filtering of the set of advertisements is based on each format combination of the set of format combinations.

11. The method of claim 1, wherein the selected advertisement is one of an image advertisement, a video advertisement, and an animated advertisement.

12. A system for supporting multiple advertisement sizes in a single advertisement unit, comprising:
   an advertisement management system configured to:
      receive a format preference for an advertisement unit specifying an advertisement unit dimensional height and an advertisement unit dimensional width of the advertisement unit of a webpage;
      determine a first set of advertisement formats based on the specified advertisement unit dimensional height and the specified advertisement unit dimensional width of the format preference of the advertisement unit, each of the determined first set of advertisement formats having a format dimensional height equal to or less than the specified advertisement unit dimensional height and a format dimensional width equal to or less than the specified advertisement unit dimensional width;
      determine, for each advertisement format of the first set of advertisement formats, a dimensional size of remaining space in the advertisement unit;
      determine, for each advertisement format of the first set of advertisement formats, a second set of advertisement formats based on the determined dimensional size of remaining space, each of the determined second set of advertisement formats having a format dimensional size equal to or less than the determined dimensional size of remaining space;
      filter a plurality of advertisements based on the determined first set of advertisement formats and the determined second set of advertisement formats; and select a first advertisement and a second advertisement from the filtered plurality of advertisements based on an auction; and an advertisement display system comprising a processing circuit, wherein the processing circuit receives the selected first advertisement, the selected second advertisement and the format preference of the advertisement unit from the advertisement management system and is configured to:

determine additional visual content to display with the selected first advertisement and the selected second advertisement based on a first dimensional size of the selected first advertisement, a second dimensional size of the selected second advertisement, and the specified advertisement unit dimensional height and the specified advertisement unit dimensional width of the format preference, the additional visual content displayed in space present in the advertisement unit and not filled by the first advertisement and the second advertisement;

apply editing properties to the determined additional visual content to be displayed with the selected first advertisement and the selected second advertisement and separate from the selected first advertisement and the selected second advertisement; and serve the selected first advertisement, the selected second advertisement and the additional visual content to be displayed at the same time in the advertisement unit, the display of the selected first advertisement, the second advertisement and the additional visual content based on the applied editing properties.

13. The system of claim 12, wherein to apply editing properties to the determined additional visual content, the processing circuit is configured to perform one of:

inserting blank space in the advertisement unit to center the selected first advertisement or the second advertisement in the advertisement unit;

inserting one or more user clickable icons in the advertisement unit;

inserting one or more attributions of the selected first advertisement or the second advertisement in the advertisement unit;

adding a border to the selected first advertisement or the second advertisement in the advertisement unit; or inserting one or more advertisement display adjustment controls in the advertisement unit.

14. The system of claim 12, wherein the advertisement management system is further configured to:

provide a set of format combinations to an advertisement selection module based on the determined first set of advertisement formats based on the specified advertisement unit dimensional height and the specified advertisement unit dimensional width of the format preference of the advertisement unit and the determined second set of advertisement formats based on the determined dimensional size of remaining space;

wherein each format combination of the set of format combinations comprises a first advertisement format from the determined set of advertisement formats and a second advertisement format from the determined second set of advertisement formats based on the determined dimensional size of remaining space for the first advertisement format; and wherein the filtering of the plurality of advertisements is based on each format combination of the set of format combinations.

15. One or more non-transitory computer-readable media having instructions stored therein, the instructions being executable by one or more processors to cause the one or more processors to perform operations comprising:

receiving a format preference for an advertisement unit specifying an advertisement unit dimensional height and an advertisement unit dimensional width of the advertisement unit;

determining a first set of advertisement formats based on the specified advertisement unit dimensional height and the specified advertisement unit dimensional width of the format preference of the advertisement unit, each of the determined first set of advertisement formats having a format dimensional height equal to or less than the specified advertisement unit dimensional height and a format dimensional width equal to or less than the specified advertisement unit dimensional width;

determining, for each advertisement format of the first set of advertisement formats, a dimensional size of remaining space in the advertisement unit;

determining, for each advertisement format of the first set of advertisement formats, a second set of advertisement formats based on the determined dimensional size of remaining space, each of the determined second set of advertisement formats having a format dimensional size equal to or less than the determined dimensional size of remaining space;

filtering a plurality of advertisements based on a set of format combinations, each format combination comprises a first advertisement format from the determined set of advertisement formats and a second advertisement format from the determined second set of advertisement formats based on the determined dimensional size of remaining space for the first advertisement format;

selecting a first advertisement and a second advertisement from the filtered plurality of advertisements based on an auction;

determining additional visual content to display with the selected first advertisement and the selected second advertisement based on a first dimensional size of the selected first advertisement, a second dimensional size of the selected second advertisement, and the specified advertisement unit dimensional height and the specified advertisement unit dimensional width, the additional visual content displayed in space present in the advertisement unit and not filled by the first advertisement and the second advertisement;

applying image editing properties to the determined additional visual content to be displayed with the selected first advertisement and the selected second advertisement and separate from the selected first advertisement and the selected second advertisement; and serving the selected first advertisement, the selected second advertisement and the additional visual content to be displayed at the same time in the advertisement unit, the display of the selected first advertisement, the second advertisement and the additional visual content based on the applied image editing properties.

16. The non-transitory computer-readable media of claim 15, further comprising instructions to cause the one or more processors to perform operations further comprising one of:

inserting blank space in the advertisement unit such that the selected first advertisement or the second advertisement appears centered in the advertisement unit;

inserting one or more user clickable icons in the advertisement unit;

inserting one or more attributions of the selected first advertisement or the second advertisement in the advertisement unit;

adding a border to the selected first advertisement or the second advertisement in the advertisement unit; and inserting one or more advertisement display adjustment controls in the advertisement unit.

* * * * *